April 6, 1926.  
S. S. HAUDENSHIELD  
RUBBER DAM  
Filed July 17, 1924
1,579,608
FIG. I.
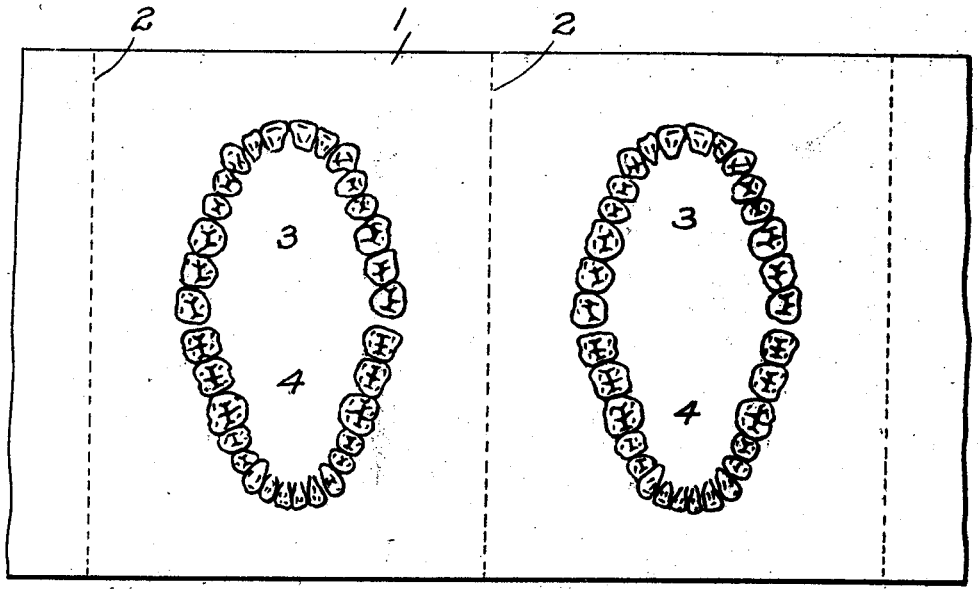
FIG. II.
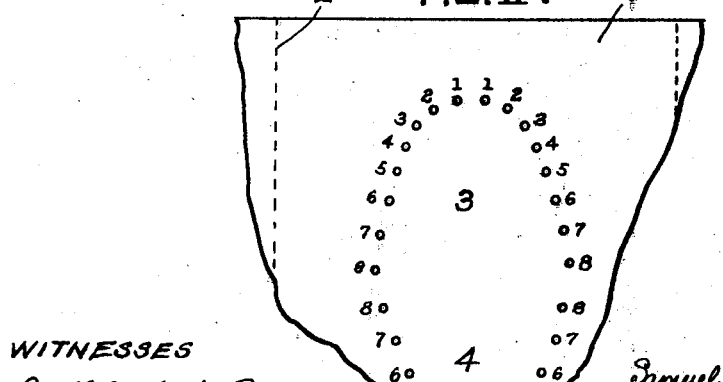
WITNESSES  
J. Herbert Bradley  
Percy A. English
INVENTOR  
Samuel S. Haudenshield  
by Christy and Christy  
his attorneys Patented Apr. 6, 1926.

1,579,608

UNITED STATES PATENT OFFICE.

SAMUEL S. HAUDENSHIELD, OF CARNEGIE, PENNSYLVANIA.

RUBBER DAM.

Application filed July 17, 1924. Serial No. 726,470.

*To all whom it may concern:*

Be it known that I, SAMUEL S. HAUDENSHIELD, residing at Carnegie, in the county of Allegheny and State of Pennsylvania, a citizen of the United States, have invented or discovered certain new and useful Improvements in Rubber Dams, of which improvements the following is a specification.

My invention relates to improvements in dentists' rubber dams, and consists in a web of rubber bearing indicia by means of which a rubber dam for each particular case may be prepared with expedition, by an attendant if desired, with accuracy, and with economy of rubber.

The invention is illustrated in the accompanying drawings. Fig. I shows in elevation a portion of a length of rubber, bearing indicia of the nature indicated, and so constituting an embodiment of my invention; Fig. II is a fragmentary view, illustrating a modification.

A web of rubber of indefinite length and of uniform and pre-determined width, conveniently coiled in a roll, is indicated in the drawing. Transverse lines 2, printed or otherwise applied to the rubber, subdivide the web into units 1 of proper size. Upon each unit 1 is printed or otherwise applied a diagram of teeth in their natural arrangement. Preferably the teeth of both the upper and lower jaws are so diagrammatically indicated, in the two diagrams 3 and 4. These diagrams are so particularly placed upon the unit 1 that when the unit is separated and when a hole is made in the web of rubber according to the diagram at a position corresponding to the tooth to which the rubber dam is to be applied, the hole will be so properly positioned that the article may serve its intended purpose.

For whatever tooth the section 1 of rubber be perforated, the margin on either side of the perforation, and above and below, will suffice for attachment of the rubber dam and for the service for which the article is intended. To illustrate, if a separated section 1 be folded on a medial horizontal line as seen in the drawing, and the folded edge introduced between one's jaws, it will be seen that the two diagrams come to approximately accurate position opposite the teeth themselves. Thus it appears that at whatever tooth attachment be made, the rubber dam will extend across the mouth cavity, and with sufficient margin on every side.

The dentist or his attendant, knowing or being advised, to what particular tooth or teeth the rubber dam is to be applied, separates from the continuous web of rubber a section 1, cutting or otherwise separating it along the line 2. Then with a punching instrument or otherwise he forms the necessary hole or holes, at the place or places where the tooth or teeth are mapped in the diagrams. The dentist then, without any loss of time consumed in fitting, applies the rubber dam in the usual manner, and with assurance that the perforation or perforations are properly spaced.

In ordinary practice and in order to be safe, a dentist in preparing a rubber dam cuts away from a large sheet of rubber a much larger piece than is necessary for the particular service. In order that he may surely have enough he uses more than he needs. Sometimes because of a mistake made in positioning the perforation he has to perforate again, or perhaps throw the piece away. Manifestly this invention makes for economy and rapidity of the dentist's work.

Fig. II serves to show that the diagram upon the web of rubber need not include a pictorial likeness of the teeth, but instead, the positions merely of the teeth may be indicated. This figure serves also to show that numbers may be set opposite the indications of the several teeth, such numbers being convenient for purposes of identification. It will further be understood that such numbering may be applied to the diagram which shows the teeth pictorially, as in Fig. I.

I claim as my invention:

A rubber dam for dentists' use consisting of a sheet of rubber of predetermined shape and size, and bearing a diagram of a set of teeth in natural relative positions, whereby, when the sheet is perforated for a given tooth and applied, a sufficient margin of rubber will remain on every side.

In testimony whereof I have hereunto set my hand.

SAMUEL S. HAUDENSHIELD.